United States Patent
Yokokawa et al.

(10) Patent No.: US 10,293,252 B2
(45) Date of Patent: May 21, 2019

(54) IMAGE PROCESSING DEVICE, SYSTEM AND METHOD BASED ON POSITION DETECTION

(71) Applicant: Sony Computer Entertainment Inc., Tokyo (JP)

(72) Inventors: Yutaka Yokokawa, Kanagawa (JP); Nicolas Doucet, Kanagawa (JP); Masafumi Noda, Tokyo (JP); Yuki Miyamae, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 845 days.

(21) Appl. No.: 14/284,737

(22) Filed: May 22, 2014

(65) Prior Publication Data
US 2014/0362188 A1    Dec. 11, 2014

(30) Foreign Application Priority Data
Jun. 7, 2013    (JP) .................. 2013-121242

(51) Int. Cl.
*A63F 9/24*    (2006.01)
*G06F 3/01*    (2006.01)
(Continued)

(52) U.S. Cl.
CPC ............ *A63F 13/42* (2014.09); *A63F 13/213* (2014.09); *A63F 13/843* (2014.09); *G06F 3/011* (2013.01);
(Continued)

(58) Field of Classification Search
CPC .......... G06K 9/00201; G06K 9/00208; G06K 9/00221; G06K 9/00268; G06K 9/00369;
(Continued)

(56) References Cited

U.S. PATENT DOCUMENTS

2007/0060336 A1* 3/2007 Marks .................... A63F 13/02
463/30
2009/0244309 A1* 10/2009 Maison .............. G06K 9/00369
348/222.1
(Continued)

FOREIGN PATENT DOCUMENTS

CN    101945223 A    1/2011
CN    101996401 A    3/2011
(Continued)

OTHER PUBLICATIONS

Office Action for corresponding application No. 201410249719.9, 8 pages, dated Feb. 3, 2016.

*Primary Examiner* — Joseph G Ustaris
*Assistant Examiner* — William Adrovel
(74) *Attorney, Agent, or Firm* — Matthew B. Dernier, Esq.

(57) ABSTRACT

An image processing device includes an image acquirer that acquires data of a shot image obtained by a camera, a depth image acquirer that acquires a depth image obtained by representing a distance of a subject from the camera in the depth direction as a pixel value, and a first object detector that detects a region of an image of a first object from the shot image or the depth image. The image processing device further includes a second object detector that detects a region of an image of a second object based on the region of the image of the first object and the pixel value in the depth image, a clipping region decider that decides a clipping region including at least the regions of the images of the first and second objects, and a display image generator that generates a display image by using the clipping region.

19 Claims, 12 Drawing Sheets

(51) Int. Cl.
*G06F 3/03* (2006.01)
*G06F 3/13* (2006.01)
*G06K 9/00* (2006.01)
*G06T 7/11* (2017.01)
*A63F 13/00* (2014.01)
*A63F 13/42* (2014.01)
*G06T 15/00* (2011.01)
*G06T 15/30* (2011.01)
*G06T 19/00* (2011.01)
*G06T 7/194* (2017.01)
*A63F 13/213* (2014.01)
*A63F 13/843* (2014.01)
*H04N 13/366* (2018.01)
*A63F 13/5372* (2014.01)

(52) U.S. Cl.
CPC .............. *A63F 9/24* (2013.01); *A63F 13/00* (2013.01); *A63F 13/5372* (2014.09); *A63F 2009/2435* (2013.01); *A63F 2300/10* (2013.01); *A63F 2300/1087* (2013.01); *A63F 2300/1093* (2013.01); *A63F 2300/65* (2013.01); *G06F 3/012* (2013.01); *G06F 3/0304* (2013.01); *G06F 3/0325* (2013.01); *G06F 3/13* (2013.01); *G06K 9/00201* (2013.01); *G06K 9/00208* (2013.01); *G06K 9/00221* (2013.01); *G06K 9/00268* (2013.01); *G06K 9/00369* (2013.01); *G06T 7/11* (2017.01); *G06T 7/194* (2017.01); *G06T 15/00* (2013.01); *G06T 15/30* (2013.01); *G06T 19/00* (2013.01); *G06T 2207/10021* (2013.01); *G06T 2207/10024* (2013.01); *G06T 2207/30196* (2013.01); *G06T 2207/30204* (2013.01); *H04N 13/366* (2018.05)

(58) Field of Classification Search
CPC . G06T 2207/10021; G06T 2207/10024; G06T 2207/10028; G06T 2207/30196; G06T 2207/30204; G06T 7/11; G06T 7/194; G06T 15/00; G06T 15/30; G06T 19/00; A63F 9/24; A63F 13/00; A63F 13/10; A63F 13/04; A63F 13/06; A63F 13/213; A63F 13/5372; A63F 2009/2435; A63F 2300/10; A63F 2300/1087; A63F 2300/1093; A63F 2300/65; G06F 3/011; G06F 3/012; G06F 3/013; G06F 3/0304; G06F 3/0325

See application file for complete search history.

(56) References Cited

U.S. PATENT DOCUMENTS

| | | | |
|---|---|---|---|
| 2009/0252423 A1* | 10/2009 | Zhu | G06K 9/00201 382/209 |
| 2010/0253766 A1* | 10/2010 | Mann | G06F 3/011 348/51 |
| 2010/0303289 A1* | 12/2010 | Polzin | G06K 9/00342 382/103 |
| 2011/0085705 A1* | 4/2011 | Izadi | G06K 9/00369 382/103 |
| 2012/0306904 A1* | 12/2012 | Francois | H04N 13/122 345/589 |
| 2013/0215014 A1* | 8/2013 | Pryor | A63F 13/06 345/156 |
| 2014/0119640 A1* | 5/2014 | Craig | G06K 9/6217 382/159 |

FOREIGN PATENT DOCUMENTS

| | | |
|---|---|---|
| CN | 102034247 A | 4/2011 |
| WO | 2007050885 A2 | 5/2007 |
| WO | 2009108645 A1 | 9/2009 |

* cited by examiner

FIG. 12
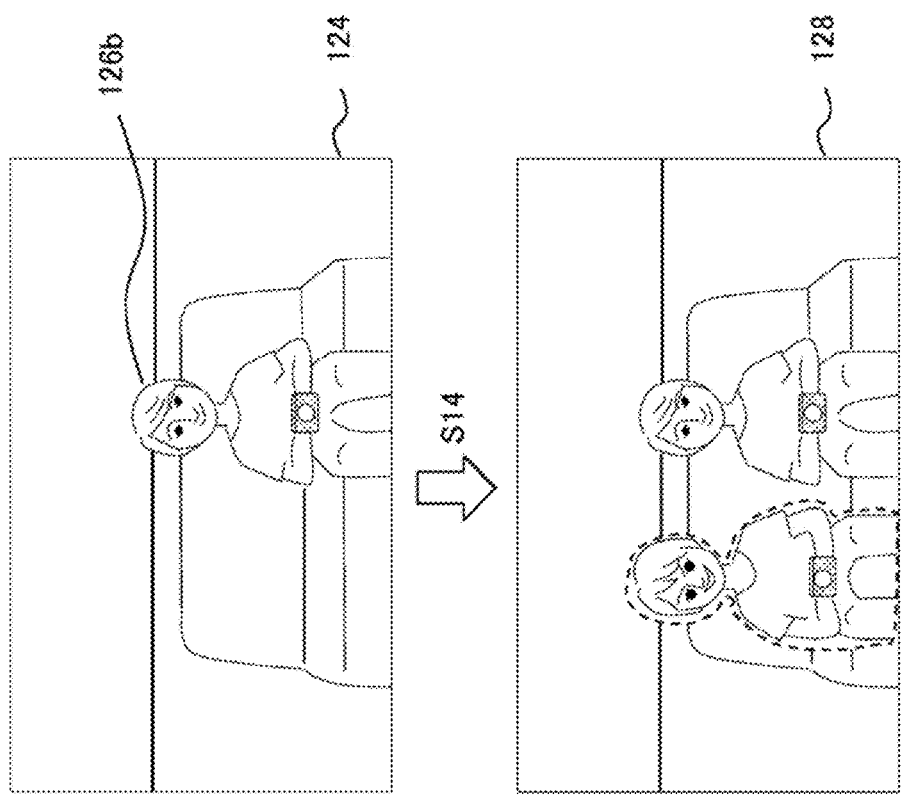
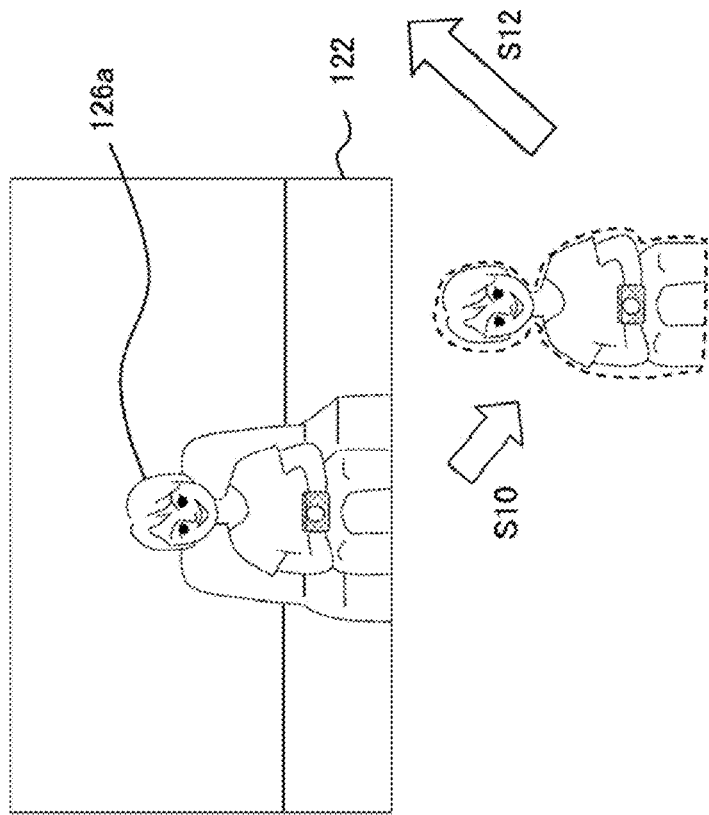

IMAGE PROCESSING DEVICE, SYSTEM AND METHOD BASED ON POSITION DETECTION

BACKGROUND

The present disclosure relates to an image processing device that executes processing based on shot images, an image processing system, and an image processing method carried out by this image processing device.

In recent years, it is becoming common to equip personal computers, game machines, and so forth with a camera and image the figure of a user to utilize the imaged figure in various forms. For example, systems that transmit an image of a user to the other side as it is via a network, such as videophone and video chat, and techniques to recognize the motion of a user by image analysis and use the motion as input information of a game or information processing have been put into practical use (refer to e.g. International Patent Publication No. WO 2007/050885 A2). Furthermore, in recent years, it is becoming possible to realize games and image expressions giving a more feeling of being at the real world by accurately detecting the motion of an object in a three-dimensional space including the depth direction.

SUMMARY

Various problems exist in shooting a space in which a verity of objects exist to determine only a desired object from the image and track the motion thereof. For example, possibly a processing result is affected due to change in the shooting environment such as a light source. Furthermore, the burden of the processing increases if object detection processing is executed with enhanced temporal resolution and spatial resolution to improve the accuracy. As a result, a long time is taken from shooting of a subject to output of the processing result and responsiveness to the motion of the subject is lowered.

There is a need for the present disclosure to provide a technique allowing position detection to be easily carried out with high accuracy in image processing using position information of an object.

According to an embodiment of the present disclosure, there is provided an image processing device. This image processing device includes an image acquirer configured to acquire data of a shot image obtained by shooting by a camera, a depth image acquirer configured to acquire a depth image obtained by representing a distance of a subject from the camera in depth direction as a pixel value on an image plane, and a first object detector configured to detect a region of an image of a first object from the shot image or the depth image based on a shape or a feature. The image processing device further includes a second object detector configured to detect a region of an image of a second object based on the region of the image of the first object and the pixel value in the depth image, a clipping region decider configured to decide a clipping region including at least the region of the image of the first object and the region of the image of the second object, and a display image generator configured to generate a display image by using the clipping region in the shot image separately from the other region.

According to another embodiment of the present disclosure, there is provided an image processing system. This image processing system includes an imaging device configured to shoot a moving image of a subject equipped with a marker and an image processing device configured to generate a display image that changes according to motion of the subject based on the position of the marker in an image frame of the shot moving image. The imaging device shoots, as the moving image, an image frame for displaying shot under a shooting condition suitable for displaying and an image frame for marker detection shot under a shooting condition suitable for detection of the marker by the image processing device in turn at a predetermined ratio. The image processing device has a marker detector that detects the marker by using the image frame for marker detection and a display image generator that generates the display image by executing image processing based on the position of the detected marker by using the image frame for displaying.

According to further another embodiment of the present disclosure, there is provided an image processing method by which an image processing device generates a display image by using a shot image obtained by shooting by a camera. The image processing method includes acquiring data of the shot image and storing the data of the shot image in a storage device, acquiring data of a depth image obtained by representing the distance of a subject from the camera in depth direction as a pixel value on an image plane and storing the data of the depth image in the storage device, and reading out the data of the shot image or the depth image from the storage device and detecting a region of an image of a first object from the read image based on a shape or a feature. The image processing method further has reading out the data of the depth image from the storage device and detecting a region of an image of a second object from the depth image based on the region of the image of the first object and the pixel value, deciding a clipping region including at least the region of the image of the first object and the region of the image of the second object, and reading out the data of the shot image from the storage device and using the clipping region separately from the other region to generate the display image and output the display image to a display device.

According to another embodiment of the present disclosure, there is provided a computer program. This computer program for a computer, includes acquiring data of a shot image obtained by shooting by a camera, acquiring a depth image obtained by representing distance of a subject from the camera in depth direction as a pixel value on an image plane, detecting a region of an image of a first object from the shot image or the depth image based on a shape or a feature, detecting a region of an image of a second object based on the region of the image of the first object and the pixel value in the depth image, deciding a clipping region including at least the region of the image of the first object and the region of the image of the second object, and generating a display image by using the clipping region in the shot image separately from the other region.

According to another embodiment of the present disclosure, there is provided a computer-readable recording medium. This computer-readable recording medium in which a computer program is recorded, the computer program being for a computer, includes acquiring data of a shot image obtained by shooting by a camera, acquiring a depth image obtained by representing distance of a subject from the camera in depth direction as a pixel value on an image plane, detecting a region of an image of a first object from the shot image or the depth image based on a shape or a feature, detecting a region of an image of a second object based on the region of the image of the first object and the pixel value in the depth image, deciding a clipping region including at least the region of the image of the first object and the region of the image of the second object, and generating a display image by using the clipping region in the shot image separately from the other region.

What are obtained by translating arbitrary combinations of the above-described constituent elements and expressions of the present disclosure among method, device, system, computer program, recording medium in which a computer program is recorded, and so forth are also effective as embodiments of the present disclosure.

According to the embodiments of the present disclosure, image displaying utilizing shot images can be easily realized with high accuracy.

BRIEF DESCRIPTION OF THE DRAWINGS

FIG. 12 is a diagram showing further another example of the display image generated by the display image generator in the embodiment of the present disclosure.

DETAILED DESCRIPTION OF THE PREFERRED EMBODIMENT

Figure 1:
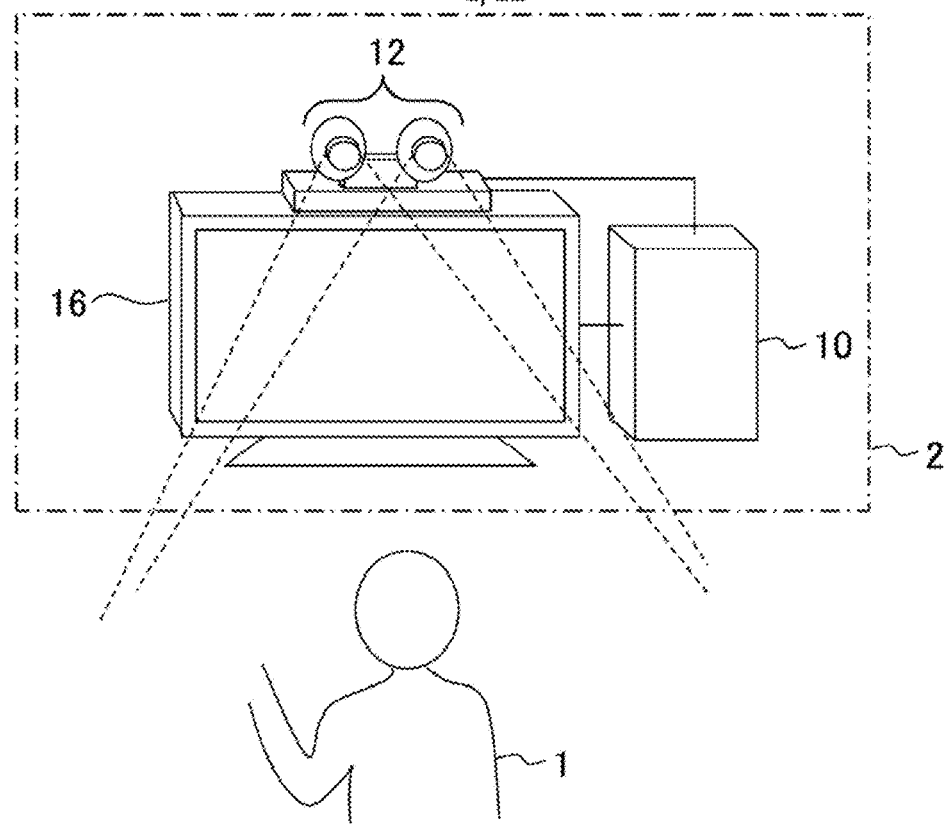
FIG. 1 is a diagram showing a configuration example of an information processing system to which an embodiment of the present disclosure can be applied.

FIG. 1 shows a configuration example of an information processing system to which an embodiment of the present disclosure can be applied. An information processing system 2 includes an imaging device 12 equipped with two cameras to shoot objects such as a user 1, an information processing device 10 that executes information processing according to a request by a user based on shot images, and a display device 16 that outputs image data obtained as the result of processing by the information processing device 10. The information processing device 10 may be allowed to connect to a network such as the Internet.

The information processing device 10, the imaging device 12, and the display device 16 may be connected by a wired cable or may be wirelessly connected by a wireless local area network (LAN) or the like. Any two or all of the imaging device 12, the information processing device 10, and the display device 16 may be combined and integrally installed. The imaging device 12 does not necessarily need to be set on the display device 16. The number and kinds of subjects are not limited.

The imaging device 12 has a configuration in which two digital video cameras each including an imaging element of e.g. a charge coupled device (CCD) or a complementary metal oxide semiconductor (CMOS) are disposed on the left and right sides at a known interval. The two digital video cameras each shoot subjects existing in the same space from a respective one of left and right positions at a predetermined frame rate. Hereinafter, the pair of frames shot in this manner will be referred to also as "stereo images."

The information processing device 10 identifies position information of subjects in a three-dimensional space including the image plane and the position in the depth direction from the cameras by using stereo images. Furthermore, the information processing device 10 detects the image of a desired object from at least one of the stereo images based on shape, color, feature, and so forth. In addition, by utilizing these pieces of information, the information processing device 10 executes information processing according to the motion of the object and generates a display image reflecting it.

For example, the information processing device 10 fuses the image of a shot user with a virtual world drawn by computer graphics and draws an object that responds to the motion of a user. Furthermore, not only generating such a display image, the information processing device 10 may carry out gesture recognition and may convert the motion of a user to a command to execute a game or information processing. As above, the use purpose of information obtained in the present embodiment is not particularly limited. The display device 16 displays the image generated by the information processing device 10. The display device 16 may be a television having a display to output images and a speaker to output sounds and examples thereof include liquid crystal television, plasma television, and PC display.

Figure 2:
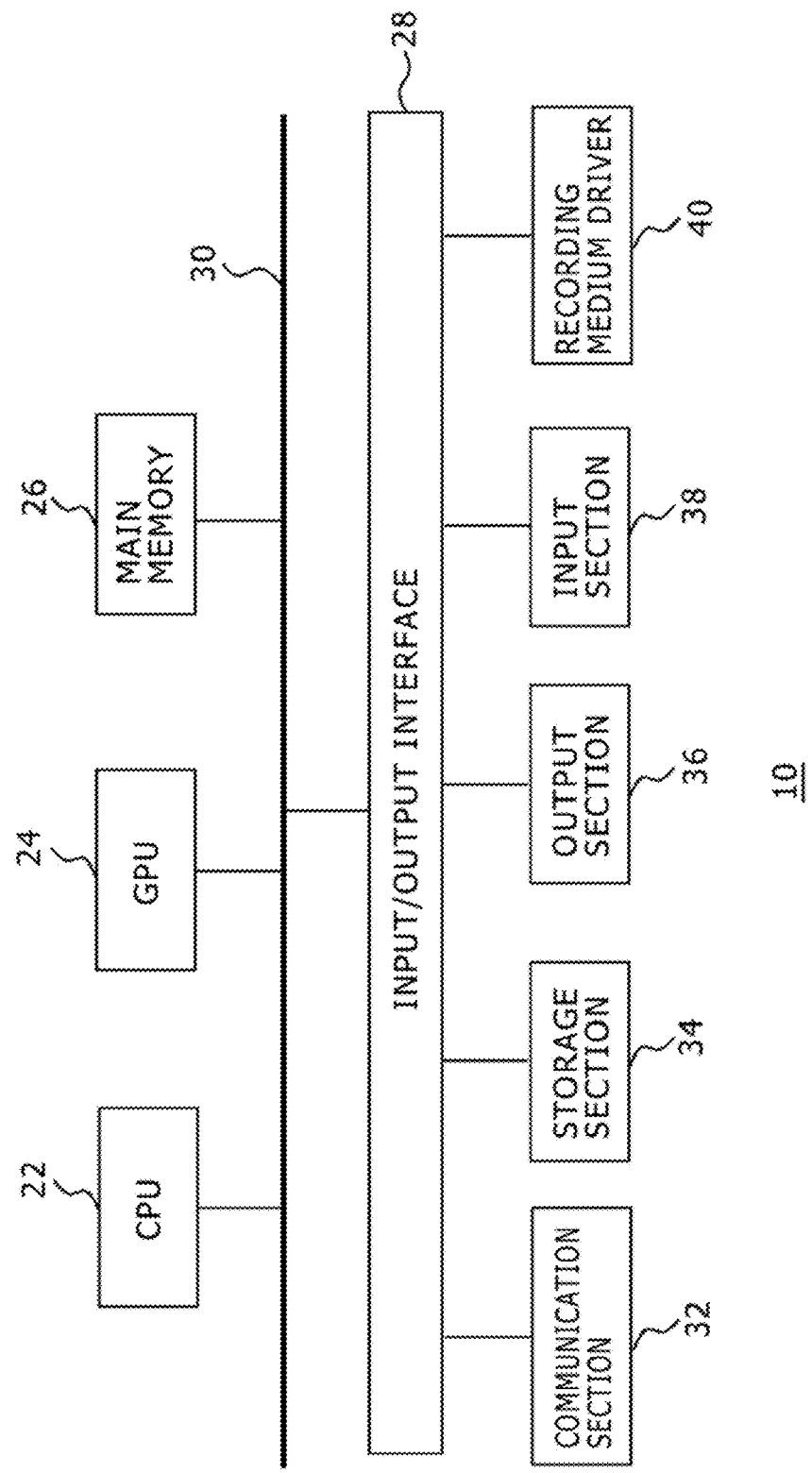
FIG. 2 is a diagram showing the internal circuit configuration of an information processing device in the embodiment of the present disclosure.

FIG. 2 shows the internal circuit configuration of the information processing device 10. The information processing device 10 includes a central processing unit (CPU) 22, a graphics processing unit (GPU) 24, and a main memory 26. The CPU 22 controls processing and signal transmission in constituent elements inside the information processing device 10 based on programs of operating system, application, and so forth. The GPU 24 executes image processing. The main memory 26 is formed of a random access memory (RAM) and stores the program and data necessary for processing.

These respective units are connected to each other via a bus 30. An input/output interface 28 is further connected to the bus 30. To the input/output interface 28, the following sections are connected: a communication section 32 formed of peripheral apparatus interfaces of universal serial bus (USB), IEEE 1394, and so forth and a network interface of a wired or wireless LAN; a storage section 34 such as a hard disk drive or a non-volatile memory; an output section 36 that outputs data to output devices such as the display device 16 and a speaker; an input section 38 to which data is input from input devices such as keyboard, mouse, the imaging device 12, and microphone; and a recording medium driver 40 that drives a removable recording medium such as a magnetic disc, optical disc, or semiconductor memory.

The CPU 22 controls the whole of the information processing device 10 by running the operating system stored in the storage section 34. Furthermore, the CPU 22 runs various kinds of programs that are read out from a removable recording medium driven by the recording medium driver 40 and the storage section 34 to be loaded into the main memory 26 or are downloaded via the communication section 32.

The GPU 24 has a function of a geometry engine and a function of a rendering processor. It executes drawing processing in accordance with a drawing command from the CPU 22 and stores a display image in a frame buffer (not shown). Then, the GPU 24 converts the display image stored in the frame buffer into a video signal and outputs it to the output section 36 and so forth.

Figure 3:
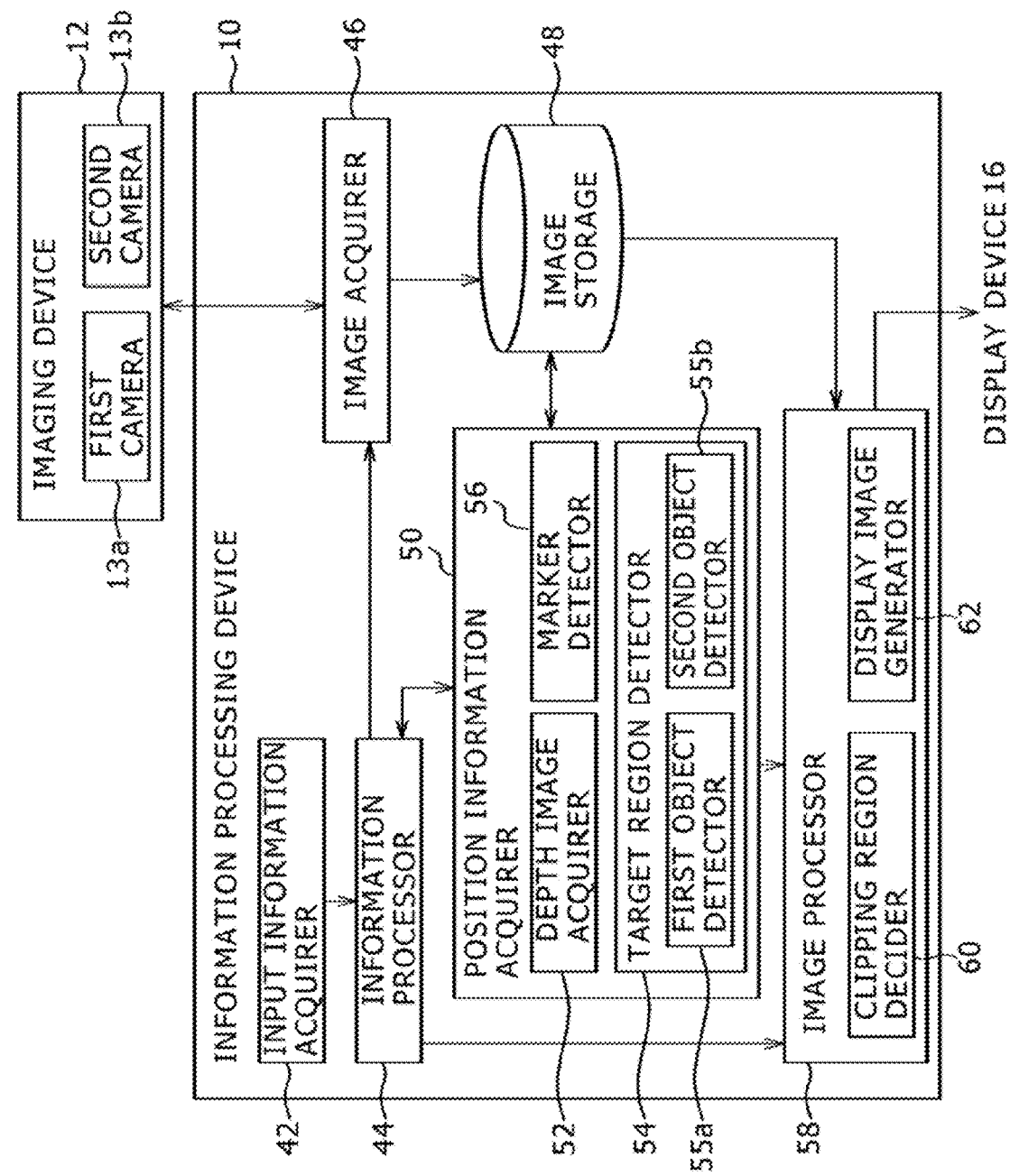
FIG. 3 is a diagram showing the functional configuration of an imaging device and the information processing device in the embodiment of the present disclosure.

FIG. 3 shows the functional configuration of the imaging device 12 and the information processing device 10. In terms of hardware, the respective functional blocks shown in FIG. 3 can be implemented by configurations of the CPU, GPU, RAM, and various kinds of processors shown in FIG. 2. In terms of software, they are implemented by programs that are loaded from the storage section 34 and recording media into the main memory 26 and exert functions such as data input function, data holding function, image analysis function, and drawing function. Therefore, it will be understood by those skilled in the art that these functional blocks can be implemented in various forms by only hardware, only software, or a combination of them, and they are not limited to any.

The imaging device 12 includes a first camera 13a and a second camera 13b. The cameras each shoot a stereo image of subjects from a respective one of left and right positions set across a known width at a predetermined frame rate. If a marker such as a light emitter is held by a user as the subject or mounted on an object to be utilized for detection of motion, the first camera 13a in the imaging device 12 shoots an image for marker detection at a predetermined cycle.

A marker having specific size, color, shape, luminance, and so forth is easy to detect from room, person, object, etc. captured as an image, and discrimination among plural markers is also made easy by setting the colors of the markers different. However, differently from the case of visual contact by the human, how the marker is captured in an image greatly changes depending on the shooting environments such as ambient brightness, whether an object is present or absent in the periphery, and ambient color and shooting conditions such as exposure time, F-number, and the depth of focus.

In the case of shooting a wide-angle image including a user and a room, generally the shooting conditions such as white balance and exposure time are automatically adjusted in matching with the shooting environments, and thereby an image balanced as a whole is acquired. However, in the case of detecting a marker in the image, changing the shooting conditions according to the environments in this manner leads to change in how the marker is captured, i.e. the color, size, shape, luminance, and so forth of the image thereof, which possibly poses an obstacle to the detection processing.

For example, in the case of using a marker that emits light, if the exposure time decided according to the brightness of the room is too long, it will be possible that the RGB values of the light emitting part of the marker are saturated and a stark white image with blurring contours is obtained irrespective of the color of the light emitter. Furthermore, if the marker moves at a comparatively high speed, possibly the image thereof will blur.

Therefore, possibly the position of the marker cannot be accurately acquired or discrimination is may be impossible when a user is discriminated by color. So, the first camera 13a shoots an image under standard shooting conditions (hereinafter, referred to as "standard image") as one of stereo images and shoots also an image under shooting conditions suitable for detection of the marker (hereinafter, referred to as "marker detection image"). Specifically, for example, in a series of image frames shot by the first camera 13a as a moving image, standard images are shot in certain time steps and marker detection images are shot in other certain time steps. In such a manner, the shooting conditions are switched with time division of the shooting period and both are each shot at a predetermined frame rate.

If no marker is used, only the standard image may be shot. Whether or not a marker is used may be allowed to be switched according to instruction input by a user or the contents of information processing to be executed. The data of the images shot by the first camera 13a and the second camera 13b are transmitted to the information processing device 10 as needed by a general method in response to a request from the information processing device 10.

The information processing device 10 includes an input information acquirer 42 that acquires instruction input from a user, an information processor 44 that executes predetermined information processing in accordance with instruction input, and an image acquirer 46 that acquires stereo images from the imaging device 12. The information processing device 10 further includes a position information acquirer 50 that acquires information relating to the positions of objects based on shot images, an image processor 58 that executes image processing based on a result of information processing and information relating to the positions of objects, and an image storage 48 that stores stereo images input from the imaging device 12, depth images generated by the position information acquirer 50, and so forth.

The input information acquirer 42 accepts start and end of processing and instruction input from a user by a measure other than shooting by the imaging device 12 and transmits a processing request signal in accordance with the accepted information to the information processor 44. The input information acquirer 42 is implemented by cooperation of general input devices such as buttons, keyboard, mouse, trackball, and touch panel and the CPU 22 and so forth that interpret the contents of operation made to the input devices and generate the processing request signal.

The information processor 44 is implemented by the CPU 22 and so forth. In accordance with a request from the input information acquirer 42, it starts information processing specified by a user and controls other functional blocks. As described above, besides generating a display image including the image of shot objects, the information processing device 10 of the embodiment of the present disclosure may execute general information processing such as advancing a game and establishing communications with other devices. However, the contents of the information processing are not particularly limited. The information processor 44 executes such information processing in accordance with specifying by a user and, in the process thereof, issues processing requests to the image acquirer 46, the position information acquirer 50, and the image processor 58 according to need.

The image acquirer 46 is implemented by the CPU 22, the communication section 32, and so forth and acquires data of shot images from the imaging device 12 to store it in the image storage 48 in accordance with a request from the information processor 44. The acquired image may be various depending on the contents of information processing to be executed or the display image to be generated. For example, all of the data of shot images may be acquired irrespective of whether or not a marker detection image is included therein. In addition, there may be timing at which only an image shot by one camera is acquired. Specifically, for example, the image acquirer 46 is allowed not to acquire a standard image simultaneously shot by the second camera 13b in the time step in which a marker detection image is shot by the first camera 13a. That is, the acquisition rates of images shot by the first camera 13a and images shot by the second camera 13b may be independently settable.

The position information acquirer 50 is implemented by the CPU 22, the GPU 24, and so forth and sequentially acquires information relating to the positions of objects based on shot images stored in the image storage 48. The position information acquirer 50 includes a depth image acquirer 52, a target region detector 54, and a marker detector 56. The depth image acquirer 52 uses stereo images to generate a depth image representing the distribution of the position in the depth direction about subjects existing in the field of view of the imaging device 12. The distribution of the position in the depth direction about subjects is obtained by a general technique such as a stereo image method. The stereo image method is a general technique in which feature points in stereo images are associated and the position of a subject in the depth direction is calculated from the parallax between them. The depth image is an image in which the distances of the respective subjects from cameras in the depth direction are mapped on the two-dimensional coordinate of the image plane and represented as pixel values.

Therefore, in the depth image, the positions in the depth direction about various kinds of objects existing in the shooting-target space, such as chair and desk, as well as main subjects such as a person are represented in association with the shapes thereof. The imaging device 12 may be provided with the function to generate the depth image. Alternatively, an irradiation mechanism of reference light such as the infrared, a reference light sensor, and a camera may be additionally provided and the depth image may be generated by analyzing the times of reflection from subjects and a sensed image. In such a case, the image acquirer 46 acquires the data of the depth image from these devices and stores it in the image storage 48. Then, the depth image acquirer 52 reads out it.

The target region detector 54 includes a first object detector 55a and a second object detector 55b. The first object detector 55a detects the image of a predetermined object in a shot image or depth image based on its shape, size, feature, and so forth. If the object is the head of a person, the first object detector 55a performs template matching with the shot image or depth image by using a template image that is so prepared as to correspond to the head shape and has a vertically-long elliptical shape, to thereby identify the region of the image of the head in the image. At this time, the detection accuracy of the head region may be enhanced by executing face detection processing for the shot image based on the features of a face. The region of the image of the head may be identified from only the face detection processing. An image corresponding to the size of an actual head may be detected by scaling the template image according to the position in the depth direction represented by the depth image.

To the matching processing, a general technique in which the matching evaluation value is calculated for each block by block matching can be applied. By switching the prepared template image and the pattern of the feature, objects having various shapes can be detected as the object detected by the first object detector 55a. The template image and information on the pattern of the feature are stored in an internal memory or the like accessible by the first object detector 55a.

The second object detector 55b detects the region of the image of an object based on the pixel values of a depth image. A continuous region having the same pixel values or pixel values in a predetermined range in which the pixel values can be deemed to be equivalent in a depth image is estimated to be the image of one object from a positional standpoint. So, among such continuous regions, a region estimated to be the image of the object is detected. The object detected here may be the same as the object detected by the first object detector 55a or may be different from it. However, by clarifying the positional relationship with the object detected by the first object detector 55a, the second object detector 55b can identify the region of the image of an object from a depth image by utilizing the detection result of the first object detector 55a.

For example, in a mode in which the first object detector 55a detects the region of the image of a head, the second object detector 55b extracts, from a depth image, the region of the image of the body of the user including the head or part of the body. This is because, if the region of the image of the head is clear, a continuous region having the same pixel values as those of this head region or neighboring pixel values in the depth image can be estimated to represent the image of the body of the user. Hereinafter, description will be made by taking as an example a mode in which the first object detector 55a detects the region of the image of the head of a person and the second object detector 55b extracts the region of the image of the body.

The marker detector 56 detects the region of the image of a marker from a marker detection image stored in the image storage 48. By forming a marker by a light emitting diode or the like having known color and shape, the image thereof can be detected by a general method such as a search in an image. In the present embodiment, an image shot under shooting conditions suitable for marker detection is used as described above. Thus, the state of the color and light of the captured marker is stable, so that the detection accuracy can be kept favorable. The marker may be tracked temporally progressively by estimating the position of the marker in the next time step based on the position of the marker detected once. In this case, a general tracking technique can be applied.

The image processor 58 is implemented by the CPU 22, the GPU 24, and so forth and generates a display image based on information relating to the positions of objects, acquired by the position information acquirer 50. The display image generated here may be various depending on information processing executed by the information processing device 10. In the following, in particular, description will be made about a mode in which the region of the image of an object is clipped from a shot image and is fused with another image. For this purpose, the image processor 58 includes a clipping region decider 60 and a display image generator 62.

The clipping region decider 60 decides a region to be clipped from a shot image based on information relating to the positions of objects, acquired by the position information acquirer 50. Specifically, the clipping region decider 60 specifies, as the clipping region, a region in a predetermined range including the region of the image of a head and the region of the image of a body detected by the target region detector 54. In the case of utilizing a marker, the clipping region decider 60 further specifies, as the clipping region, a region in a predetermined range including also the region of the image of the marker detected by the marker detector 56.

The display image generator 62 cuts out (separates) the region decided by the clipping region decider 60 from the shot image and combines it with another image for example to generate data of a display image. Alternatively, another image may be drawn or combined in the region other than the clipping region in the shot image. The data of the display image generated as the result of the processing is output to the display device 16 and displayed. Alternatively, it may be transmitted to another device via a network. The image processor 58 may transmit data of a clipping region to another device and receive data of a display image from another device as described later. Alternatively, the image processor 58 may receive data of a clipping region transmitted from another device and generate data of a display image to transmit it to another device.

Figure 4:
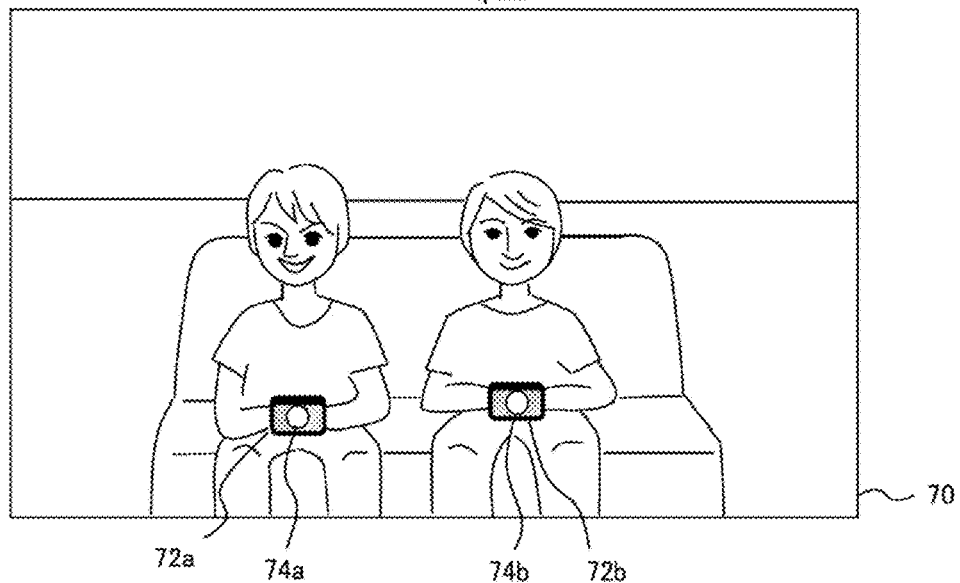
FIG. 4 is a diagram showing an example of a shot image that is shot by the imaging device and is acquired by the information processing device in the embodiment of the present disclosure.

FIG. 4 shows an example of a shot image that is obtained by shooting by the imaging device 12 and is acquired by the information processing device 10. A shot image 70 is obtained by shooting a state in which two users are sitting on a sofa as shown in the diagram. The users hold input devices 72a and 72b such as game controllers respectively. Markers 74a and 74b are provided on the front surfaces of the input devices 72a and 72b, respectively. The markers 74a and 74b are formed by e.g. light emitting diodes that emit light with colors different from each other. However, the markers 74a and 74b do not need to emit light and the form thereof is not limited as long as they have known color, shape, and size and can serve as the detection target.

The input devices 72a and 72b include the necessary input measures such as various kinds of buttons and a joystick according to the contents of information processing executed by the information processing device 10. Alternatively, the input devices 72a and 72b may be configured with only the markers 74a and 74b. Alternatively, separately from the input devices 72a and 72b including input measures such as buttons, the markers 74a and 74b may be mounted on the bodies of users or the like. At this time, the number of markers is not particularly limited.

Figure 5:
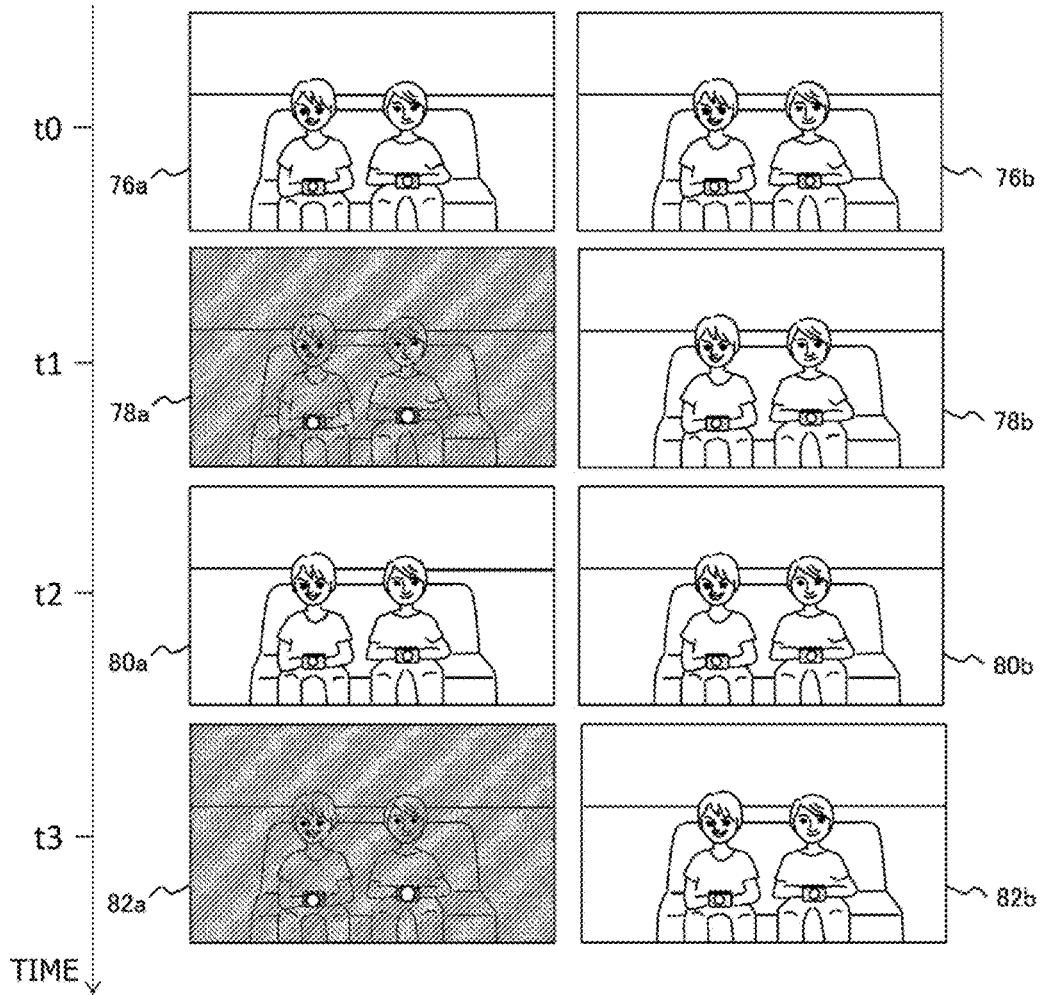
FIG. 5 is a diagram showing time change of image frames shot by a first camera and a second camera of the imaging device in the embodiment of the present disclosure.

FIG. 5 shows the time change of the image frames, with the vertical direction defined as the time axis, when the state shown in FIG. 4 is shot as a moving image by the first camera 13a and the second camera 13b of the imaging device 12. Times t0, t1, t2, t3, . . . represent the shooting timing of the respective image frames defined by the shooting frame rate, i.e. time steps. First, at the time to, an image 76a is shot by the first camera 13a and an image 76b is shot by the second camera 13b. The images 76a and 76b are both a standard image that can be used for displaying and so forth and are similar images except for that a parallax is generated between both.

An image 78a shot by the first camera 13a at the next time t1 is a marker detection image shot under shooting conditions suitable for marker detection. In the case of this image, compared with the standard image shot at the time t0 for example, the exposure time is shorter and the depth of focus is shallow (F-number is small) because the focus is on the markers. By the shooting under such conditions, the image 78a is obtained as an image in which the color, shape, size, and luminance of the light emitting part of the markers are close to those of actual ones although the image is dark as a whole and other objects blur. As the conditions under which a marker detection image is shot, only at least one of the exposure time and the F-number may be changed or another parameter may be changed.

On the other hand, an image 78b shot by the second camera 13b at the time t1 may be a standard image similarly to the time t0. Subsequently, an image 80a shot by the first camera 13a at the time t2 and an image 80b shot by the second camera 13b are both a standard image similarly to the time t0. An image 82a shot by the first camera 13a at the time t3 and an image 82b shot by the second camera 13b are a combination of a marker detection image and a standard image similarly to the time t1.

By continuing such shooting, stereo images formed of combinations of standard images shot simultaneously and marker detection images can be acquired with a minute time difference on the same shooting time axis. Therefore, almost no time difference is caused in the image of the head detected from any of the stereo images or a depth image, the image of the body extracted from a depth image, and the image of the marker detected from the marker detection image. As a result, even when the motion of the user is fast and large, a temporal offset is hardly caused in region information of these images and the image of the user can be accurately identified in the respective time steps.

In the example of FIG. 5, the first camera 13a alternately shoots the standard image and the marker detection image. However, the shooting frequencies of the respective images are not limited thereto. Specifically, e.g. a rule that a marker detection image is shot n times every time a standard image is shot m times may be set with arbitrary natural numbers m and n according to the degree of importance of information obtained from the respective images. The first camera 13a and the second camera 13b do not necessarily need to perform shooting at the same frame rate. For example, the second camera 13b may skip shooting at time when the first camera 13a shoots a marker detection image.

If both cameras perform shooting at the same frame rate as shown in FIG. 5, it is also possible that the standard images shot by the second camera 13b at the times t1 and t3, when the first camera 13a shoots marker detection images, are used in order to acquire auxiliary information of face detection, face recognition, and so forth. In any case, the image of the user can be cut out and processed with high accuracy by integrating plural kinds of position information acquired at substantially the same time and deciding a clipping region from a standard image of the same time based on the integrated information.

The shooting conditions of the stereo images shot by the two cameras at the times t0 and t2 may be the same or may be different. The shooting conditions may be independently set depending on information desired to be acquired from shot images. For example, the exposure time and so forth can be independently adjusted within such a range that feature points can be extracted even in the case of acquiring a depth image by another measure or generating a depth image from a stereo image. Based on this, at least one of the stereo images may be shot under shooting conditions suitable for further another kind of detection processing.

In the imaging device 12, information relating to shooting condition switch patterns that define whether or not to switch the shooting conditions and what rate the conditions are switched at in the case of switching the conditions is stored in advance. Furthermore, the information processing device 10 transmits, to the imaging device 12, a control signal to select any of the patterns depending on whether or not a marker is used and the contents of information processing to be executed. Therefore, shooting is started with a selected pattern.

Figure 6:
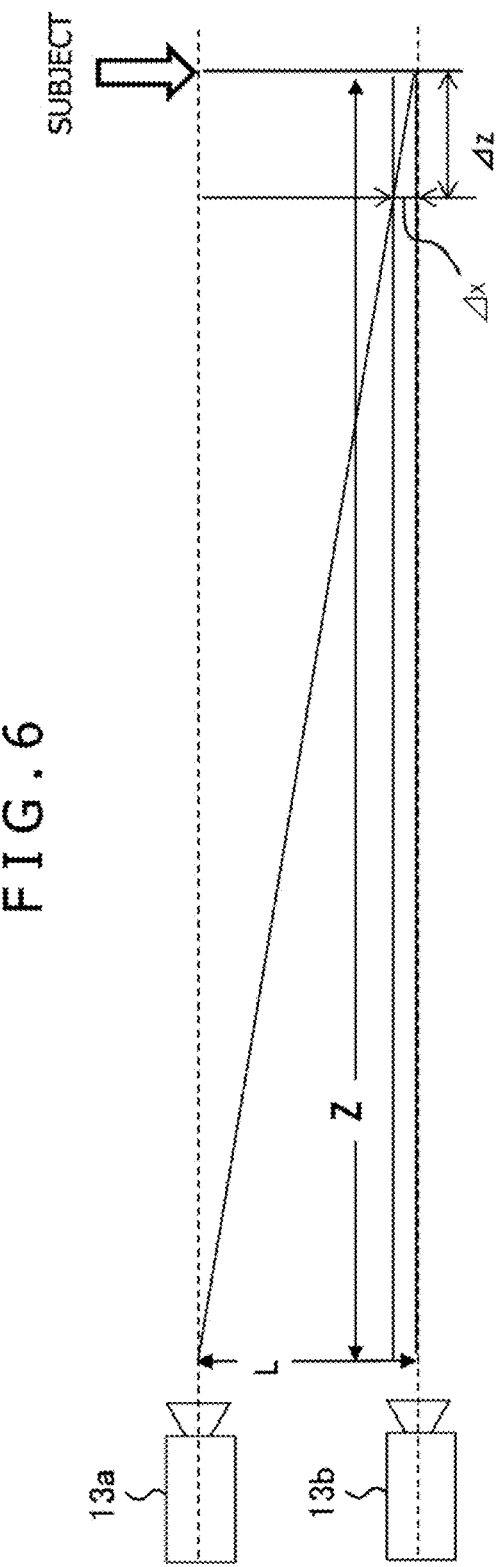
FIG. 6 is a diagram for explaining the relationship between the parallax in stereo images and the position of a subject in the depth direction.

A general stereo image method can be applied to a technique for deriving the distance of a subject from the cameras by using stereo images, and the distance is calculated as follows for example. FIG. 6 is a diagram for explaining the relationship between the parallax in the stereo images and the position of a subject in the depth direction. Suppose that here the units of length are unified to the meter or the like unless stated. The first camera 13a and the second camera 13b are so set as to have parallel optical axes positioned across distance L. Suppose that the subject exists at a position of the right-end arrow distant from these stereo cameras by distance Z in the depth direction.

A width $\Delta x$ in the actual space represented by one pixel of images shot by the respective cameras is proportional to the distance Z and expressed as follows.

$$\Delta x = Z \times w / W \quad (1)$$

In this expression, W denotes the number of pixels in the horizontal direction of the cameras and w denotes the range of the field of view in the horizontal direction of the actual space when the distance Z is 1 and is determined by the angle of sight.

The same subject shot by the cameras separate by the distance L has, on the images thereof, a parallax D (pixels) in terms of the number of pixels represented below substantially.

$$D = L/\Delta x = L \times (W/w) \times (1/Z) = C/Z \quad (2)$$

In this expression, C is a value determined by the cameras and setting thereof and can be regarded as a constant in operation. When it is assumed that a parallax $D_{at1}$ (pixels) when the distance Z is 1 is known, the distance Z in the depth direction can be obtained as follows with respect to the arbitrary parallax D (pixels).

$$Z = D_{at1}/D \quad (3)$$

Figure 7:
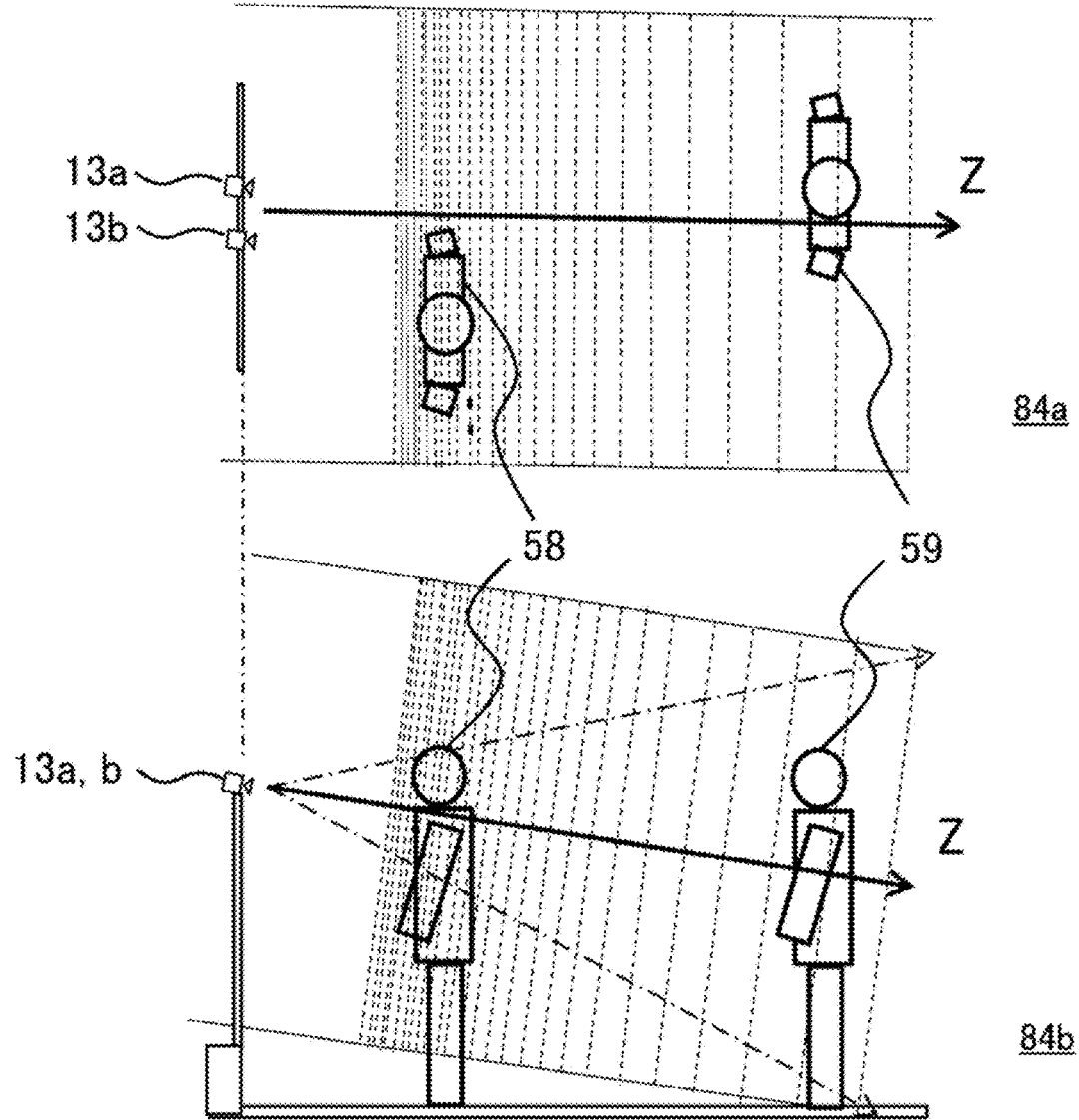
FIG. 7 is a diagram for explaining the axis of the depth direction in a shooting space in the embodiment of the present disclosure.

FIG. 7 is a diagram for explaining the axis of the depth direction in the shooting space. The upper side of this diagram is a schematic diagram 84a obtained by viewing the shooting space from above, and the lower side is a schematic diagram 84b obtained by viewing it from a lateral side. Users 58 and 59 as subjects exist in the field of view of the first camera 13a and the second camera 13b.

Suppose that, as shown in FIG. 7, the optical axes of the first camera 13a and the second camera 13b are parallel and no deviation exists in the vertical direction. Although actually a deviation is caused in some cases, suppose that images shot in such an environment are corrected to the deviation-free state by a general technique. In the diagram, dotted lines represent iso-parallax planes. The iso-parallax plane is such a plane that the parallax is equal at all points on the plane. Hence, from expression (2), it is a plane on which the distance Z from the cameras is equally calculated. Therefore, the distance Z in the depth direction is defined by the distance from the shooting plane (sensor surface) of the cameras on the axis (optical axis) perpendicular to the iso-parallax planes as shown in the diagram.

Figure 8:
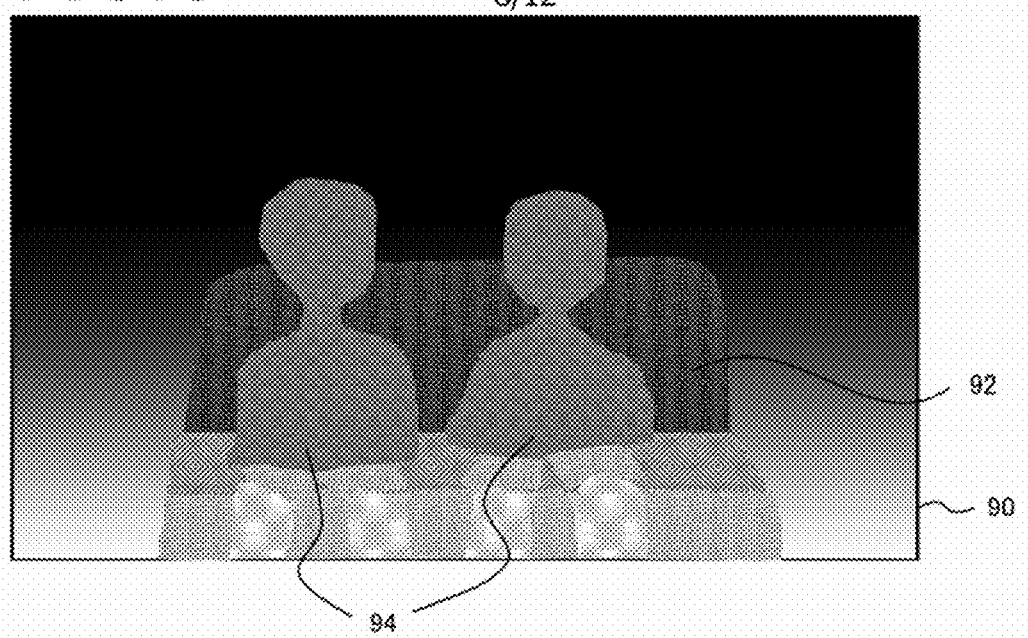
FIG. 8 is a diagram schematically showing a depth image acquired by a depth image acquirer by a stereo image method in the embodiment of the present disclosure.

FIG. 8 schematically shows a depth image acquired by the depth image acquirer 52 by the above-described stereo image method based on the assumption of the stereo images shot at the times t0 and t2 in FIG. 5. The depth image of this case represents that the distance Z in the depth direction is shorter, i.e. the position is closer to the cameras, when the pixel value is larger. However, this does not intend to limit the data format of the depth image thereto. When such a depth image is displayed as an image, a subject closer to the cameras has higher luminance. In a depth image 90 of FIG. 8, the difference in the luminance in image displaying is represented by setting the density of hatching lower in a region having a larger pixel value.

As shown in this diagram, in the depth image 90, an image 92 of a sofa and an image 94 of two users as subjects are represented as rough regions according to the position in the depth direction. By utilizing such a depth image, the whole regions of the images of the respective subjects can be identified from a macroscopic standpoint irrespective of minute structures, color changes, and so forth in the actual shooting space.

Therefore, if the region of the image of a head is separately identified in advance by matching processing or face detection processing as described above, a region that is continuous from the region of the head and has pixel values in a predetermined range can be estimated to be the region of the image of the body of the user. The range of the pixel values to be extracted can be decided according to errors included in the depth image and the distribution range of the pixel value attributed to the thickness and irregularity of the body.

Figure 9:
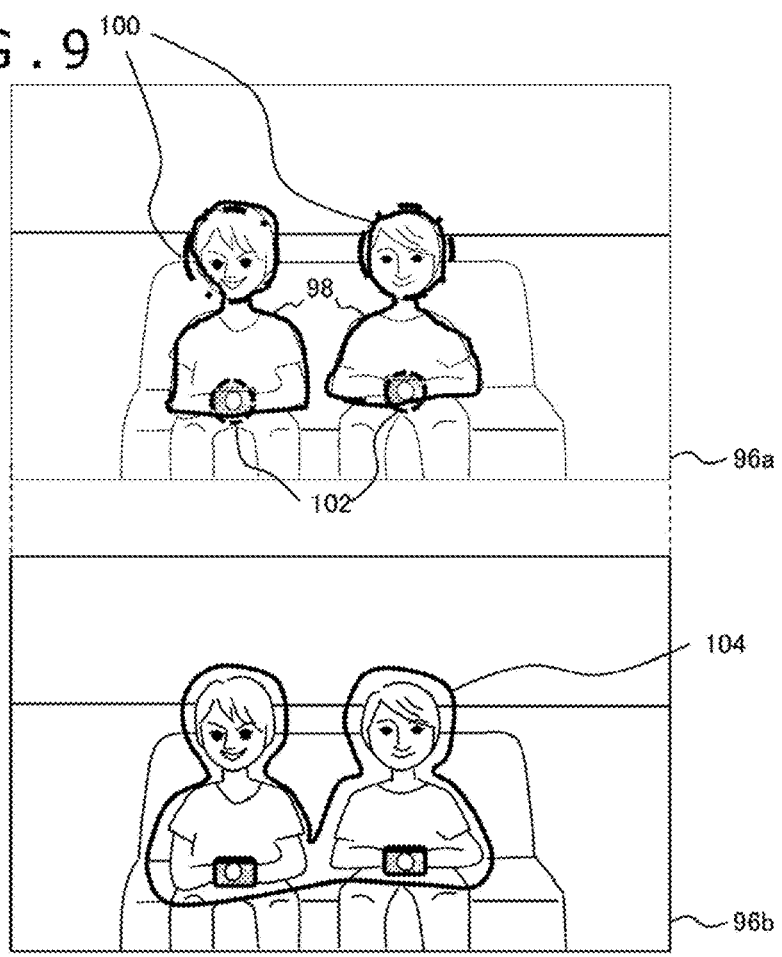
FIG. 9 is a diagram schematically showing the regions of the respective images detected by a position information acquirer and a clipping region decided by a clipping region decider in the embodiment of the present disclosure.

FIG. 9 schematically shows the regions of the respective images detected by the position information acquirer 50 and a clipping region decided by the clipping region decider 60 for the shot images of FIG. 5. Images 96a and 96b are e.g. standard images shot by the first camera 13a and these standard images are clipped to be used also for generation of a display image. That is, the position information acquirer 50 obtains the regions of the respective images in the field of view of the first camera 13a and also unifies the clipping target to subjects in the standard image shot by the first camera 13a.

This prevents generation of any offset corresponding to the parallax in the display image due to e.g. confusion of position information in an image shot by the second camera 13b, which involves the parallax. Because marker detection is carried out by using a marker detection image, preferably the marker detection image and the image used for generation of the display image are shot by the same first camera 13a.

The image 96a on the upper side represents the regions of the respective images acquired by the position information acquirer 50. Regions 100 indicated by one-dot chain lines in the image 96a are the regions of the images of the heads of users detected by the first object detector 55a of the target region detector 54 and are detected by matching between the depth image 90 of FIG. 8 or a standard image and a template image of the head, face detection processing in a standard image, or another method. Regions 98 indicated by heavy solid lines are the regions of the images of the bodies of the users extracted from the depth image 90 of FIG. 8 based on pixel values by the second object detector 55b of the target region detector 54.

Regions 102 indicated by chain lines are the regions of the images of markers detected by the marker detector 56 and are detected by searching or tracking in a marker detection image. On the other hand, a region 104 indicated by solid lines in the image 96b on the lower side represents a clipping region decided by the clipping region decider 60 based on the regions of the respective images shown in the image 96a. As shown in the image 96a, the regions of three kinds of images acquired by the position information acquirer 50 are each acquired based on an individual criterion. Therefore, the inclusion relationship and positional relationship among them can variously change depending on the shooting status, the calculation accuracy, and so forth.

So, the clipping region decider 60 decides, as the clipping region, the region 104 that includes all of these regions and further includes a predetermined margin region. For example, a region obtained by outward expanding the region (union) of the pixels included in at least any of three kinds of regions by a predetermined number of pixels or a predetermined width is decided as the clipping region. Alternatively, a region including regions obtained by expanding three kinds of regions by weights each given to a respective one of these regions may be decided as the clipping region.

Furthermore, directionality may be given to the region expansion particularly about the region of the image of the body extracted from a depth image by the second object detector 55b. For example, when the leg part closer to the cameras in the sitting state is also desired to be clipped in addition to the upper body, on which the positions in the depth direction are almost equal to each other, the amount of expansion in the downward direction is set larger than that in the other directions in the image plane. The correspondence relationship between the direction and the expansion amount is settled in advance according to the assumed posture of the user. Erroneous detection may be prevented from being reflected in the display result by setting e.g. a rule that, if any region of three kinds of regions is separate by a predetermined amount or larger in the image plane, this region is not used for decision of the clipping region.

Figure 10:
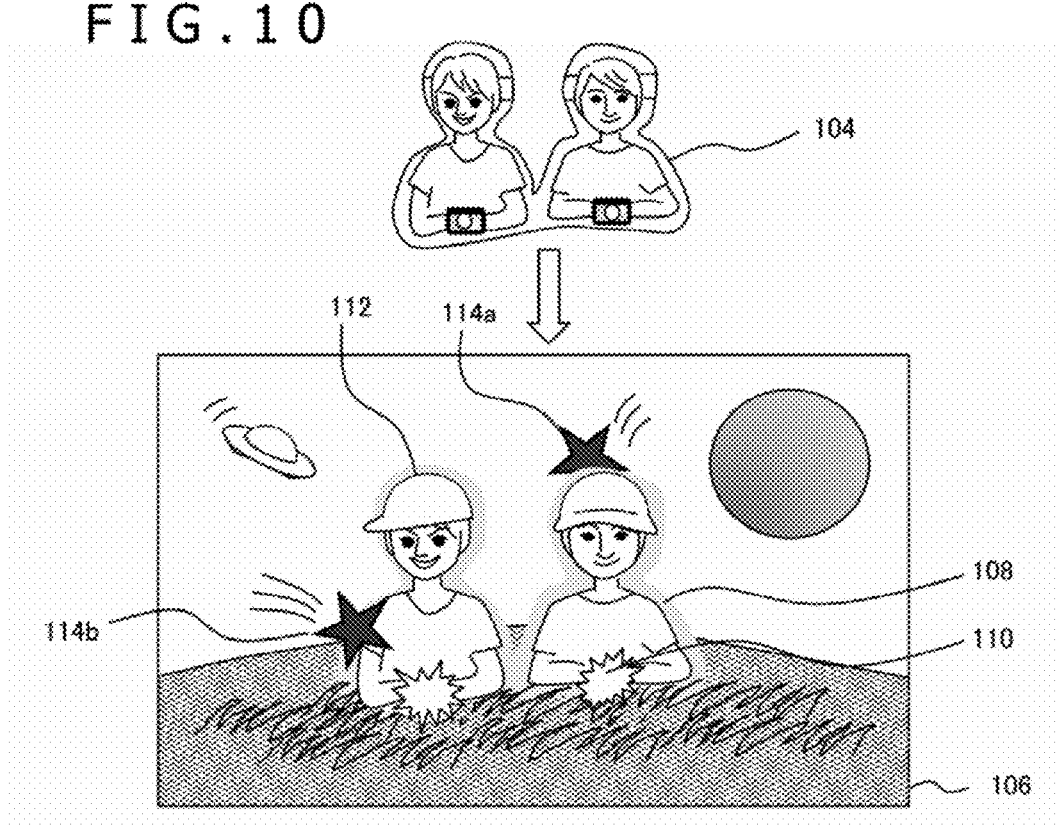
FIG. 10 is a diagram showing an example of a display image generated by a display image generator by using the clipping region in the embodiment of the present disclosure.

FIG. 10 shows an example of a display image generated by the display image generator 62 with use of a clipping region. Actually, by subjecting the display image to mirror-image inversion processing to horizontally invert the clipping region, the user who views the display device 16 displaying it is facilitated to understand the correspondence relationship between the user and the image. However, in FIG. 10, the clipping region is shown as it is to clarify the correspondence with the clipping region. This is the same also about the subsequent diagrams. An image 106 is an image in which the actual images of users are fused with a virtual world by combining the region 104 clipped from a standard image shot by the first camera 13a with an image drawn by computer graphics.

In the image 106, the boundary of the clipping region 104 is made inconspicuous by causing a region 108 near the boundary to be semi-transparent and be alpha-blended with the image of the virtual world for example. The boundary may be hidden and rendering may be made as if the users emitted light by superimposing graphics that appear to emit light on the region 108 near the boundary. The image with which the clipping region is combined is not limited to computer graphics and may be e.g. a still image or moving image of a landscape, room, etc. separately shot, and such an image may be combined with an image drawn by computer graphics.

Not only combining the clipping region with another image in this manner, the display image generator 62 may carry out various kinds of processing based on information acquired by the position information acquirer 50. For example, a luminous object 110, a weapon, or the like is drawn at the position of the marker detected by the marker detector 56 in a superimposed manner. Therefore, the input device or the like held by the actual user is hidden and the image is expressed as if the user held an object suitable for the virtual world. In the case of making the color of the marker different from user to user, the marker detector 56 may detect the image of the marker on each color basis.

Furthermore, based on it, the display image generator 62 may change the color of the object 110 on each user basis and express the image as if users had different weapons. Such processing and object drawing to be described later can be similarly carried out also based on the regions of the respective images in a shot image. Therefore, the display image generator 62 may perform processing and drawing directly on a shot image without executing clipping processing to make a display image.

In the case of combining, in the display image 106, the clipped image of a user with the same size and at the same position as those in a shot image, the position of a marker in the shot image acquired by the position information acquirer 50 may be directly employed as the position of the marker in the display image. On the other hand, in the case of executing mirror-image inversion processing or combining a clipped image after scaling it or changing the position at which an image is combined, the position coordinates of a marker are converted according to these kinds of processing and the position coordinates on a display image are obtained. This is the same also for processing for other images.

Based on the region of the image of the head detected by the target region detector 54, a hat 112 may be drawn on the head of each user in a superimposed manner. At this time, the color of the marker held by each user may be identified based on the relative positions of the head and the marker, and the color of the hat may be decided in matching with the color of the marker. The color of the marker may be added in a semi-transparent manner to not only the hat but also the whole image of each user and a peripheral region for example. For example, when the information processor 44 is executing a game in which a score is acquired in real time, such as a shooting game, the respective scores may be displayed above the heads of users (not shown in the diagram). This mode can be implemented by associating the score with the region of the image of the score and the head based on the score of the present timing counted corresponding to the controller held by the user and the relative positions of the marker provided in this controller and the head.

Furthermore, objects 114a and 114b moving in the virtual world may be so drawn as to be hidden by the image of the user when moving to the back side of the user so that a more feeling of being at the real world may be given to the users. Specifically, to the region that is combined by clipping and represents the image of the user, a predetermined Z value as a position in the depth direction in the camera coordinate system of the virtual world is given. This Z value is reflected also in the position of the image of the user in the virtual world. Furthermore, in drawing of the moving objects 114a and 114b, whether or not to draw the object is decided on each pixel basis by comparing the Z value of this object in each time step with the Z value of the image of the user similarly to general hidden surface removal processing.

The drawing of the objects 114a and 114b is started as if they appeared in response to predetermined operation to the input device by the user for example. At this time, if they are so drawn as to emerge from the vicinity of the hands of the user, at which the marker is located, rendering can be made as if they emerged in response to the operation. Moreover, the display image generator 62 acquires, from the position information acquirer 50, information relating to the region of the image of the body of the user from which the object is made to emerge in the clipped region. Then, based on the region of the image of this body in the display image plane, the display image generator 62 decides the movement route and behavior of the object and draws the respective image frames. Depending on the route at the time, the above-described hidden surface removal processing is appropriately executed. This allows expression of a state in which the object flies around the user who has caused the emergence thereof or the object remains on the body of the user or the object throws a thing to the user.

In the example of FIG. 10, the clipping region is combined with the image of the virtual world. However, an image obtained by drawing objects on a shot image without executing clipping and combining processing may be employed as a display image. Also in this case, by utilizing region information of the image of the body of the user acquired by the position information acquirer 50, the display image generator 62 can represent an object that moves according to the position and motion of the user by processing similar to the above-described processing. Depending on the case, information relating to the regions of the images of head and marker may be further utilized. As the position (Z value) of the image of the body of the user in the depth direction, used for the hidden surface removal processing, the pixel value in a depth image acquired by the depth image acquirer 52 can be utilized as it is.

Moreover, the position of the head or the position of the marker in the image 106 may be zoomed in depending on processing executed by the information processor 44. In this case, when the standard image shot by the imaging device 12 has a sufficient resolution for the zoom-in displaying, the display resolution of the image of the clipping region is enhanced while the displayed region in the display image 106 is reduced.

When zoom-in is necessary in shooting by the imaging device 12, first the position information acquirer 50 notifies the information processor 44 of the positions of the acquired images of head and marker. In response to this, the information processor 44 requests the imaging device 12 to zoom in the relevant region via the image acquirer 46 for example. Therefore, the imaging device 12 shoots the specified region with zoom-in. For this purpose, the imaging device 12 is provided with an electronic pan/tilt mechanism for example so that the field of view of the imaging device 12 can be controlled from the information processing device 10.

Processing of generating a display image by using the zoom-in image shot in this manner is similar to that in the examples described thus far. Due to this, changes can be given to the display image according to the contents of information processing. Besides, more detailed information such as face recognition, facial expression recognition, and the minute motion of the marker can be acquired and the variations of the contents themselves of the information processing can also be increased.

Figure 11:
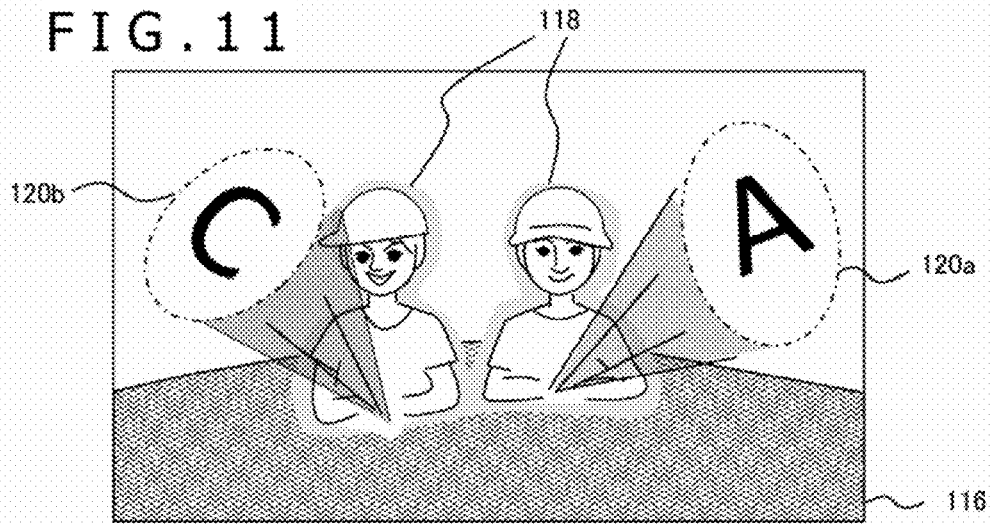
FIG. 11 is a diagram showing another example of the display image generated by the display image generator in the embodiment of the present disclosure.

FIG. 11 shows another example of the display image generated by the display image generator 62. In an image 116, an image 118 of users clipped from a shot image is combined with an image drawn by computer graphics similarly to the image 106 in FIG. 10. Furthermore, in this example, objects 120a and 120b that move in such a manner as to correspond to the motion of markers held by the users are drawn. In the example of this diagram, characters that float up in the air by light emitted from the vicinity of the hands of the users are represented as the objects. When the user changes the position and direction of the marker, the object of the light and character is moved in link with this.

For this purpose, the marker detector 56 identifies the position and orientation of the marker for each time step by using a marker detection image. The orientation of the marker can also be detected from a shot image if the marker is given an elongated shape or is formed by an array of plural light emitters so that the shape of the image thereof in the shot image may change depending on the orientation relative to the cameras. Alternatively, a gyro sensor, acceleration sensor, or the like may be mounted inside the input device provided with the marker and the orientation of the input device may be identified from a detection value of the sensor to calculate the orientation of the marker based on it.

By displaying the objects 120a and 120b that react to the motion of the user in this manner, in addition to allowing the image of the user to exist in the virtual world, interaction between the objects and user in this virtual world can be rendered. Furthermore, it is also possible to realize match-type games and virtual sports by employing weapons or gears as objects. In this example, the display position and form of the object are changed depending on the position and orientation of the marker. However, based on another piece of position information acquired by the position information acquirer 50, i.e. position information of the head or body, an object may be so displayed as to react to the motion of the head or body.

FIG. 12 is a diagram for explaining further another example of the display image generated by the display image generator 62. In this example, users existing at different places are shot by the respective devices and shot images are combined to generate an image as if the users were present at one place. Images 122 and 124 are images obtained by shooting a first user 126a and a second user 126b, respectively. Although at least the imaging device 12 to shoot the first user 126a shoots stereo images similarly to the description made thus far, only one shot image is shown in this diagram.

The information processing device 10 on the side of the first user 126a decides a clipping region based on the region of the image of the head, the region of the image of the body, and the region of the image of the marker as described above. Then, the information processing device 10 cuts out this clipping region from the image 122 as a standard image (S10) and transmits data thereof to the information processing device 10 on the side of the second user 126b (S12). Because the shot image is a moving image, this data transmission processing is sequentially repeated for each image frame. A general technique can be utilized for the processing procedure relating to establishment of communications between the two information processing devices 10 and transmission and reception of data.

The information processing device 10 on the side of the second user 126b combines the transmitted data of the clipping region with the standard image 124 obtained by shooting the second user 126b to generate a display image 128 (S14). If the position information acquirer 50 acquires the position of the image of the second user 126b similarly to the examples described thus far, the transmitted image of the first user 126a can be disposed adjacent to it. The field of view of the camera may be adjusted before shooting start so that the second user 126b may be captured at a proper position set in consideration of the image combining. The data of the image of the first user 126a is transmitted at a predetermined rate and thus the combining processing is repeated for each image frame to be displayed.

The generated display image 128 is displayed on the display device 16 on the side of the second user 126b. Meanwhile, the data thereof is transmitted to the information processing device 10 on the side of the first user 126a and thereby the same image is displayed also on the side of the first user 126a. If simultaneously their audio data are transmitted to each other by an existing technique, a chat application that allows the users to enjoy talking with rendering made as if they were present in the same room can be realized. In the example of FIG. 12, the image of the first user 126a is combined with the shot image on the side of the second user 126b. However, the image of either user may be cut out from the original shot image and combined with an image of a virtual world like that exemplified in FIG. 10 or 11 or an image of a separately shot room or the like.

Figure 13:
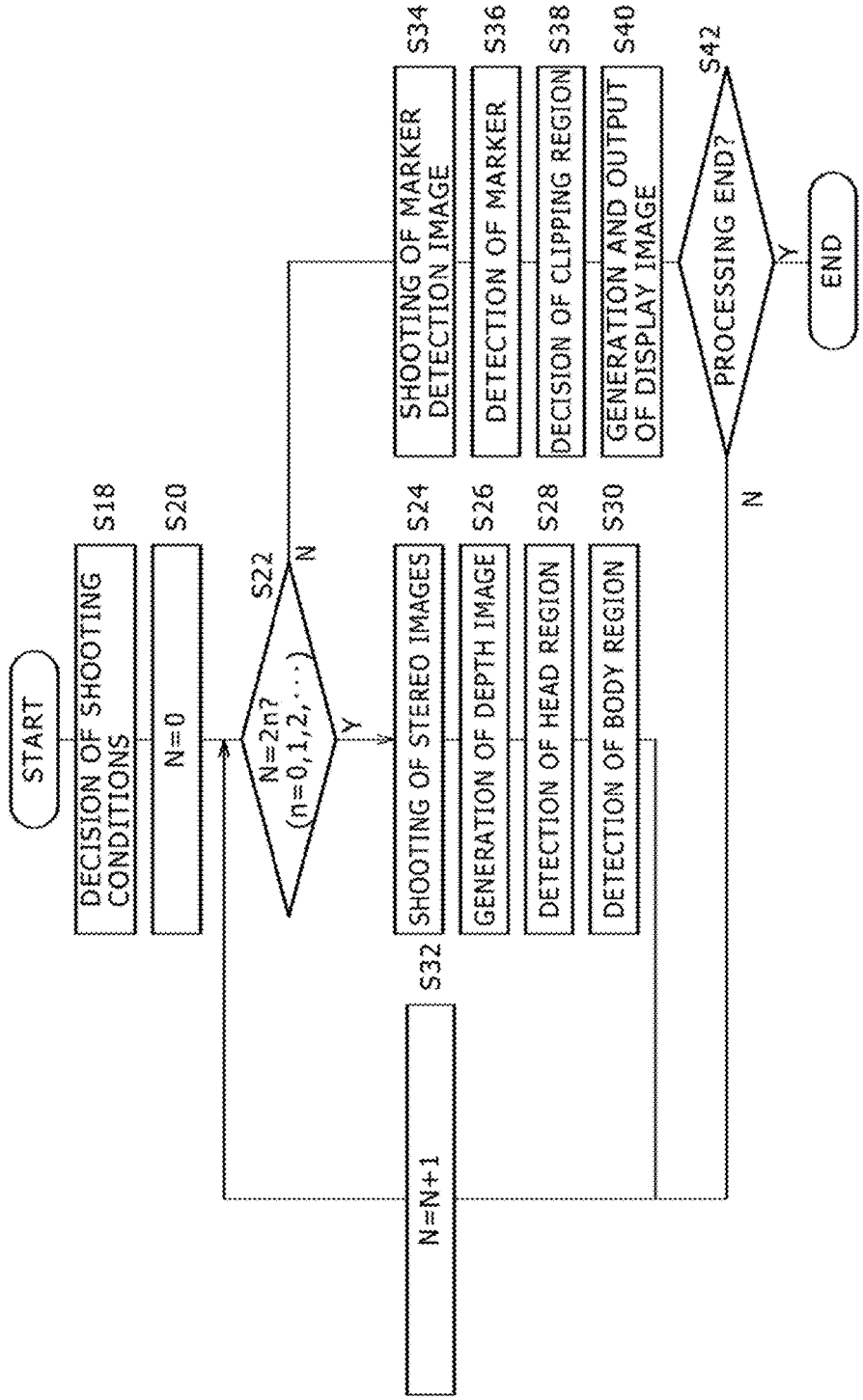
FIG. 13 is a flowchart showing a processing procedure in which the information processing system displays an image according to the motion of a user in the embodiment of the present disclosure.

Next, the operation of the information processing device implemented with the configuration described thus far will be explained. FIG. 13 is a flowchart showing a processing procedure in which the information processing system 2 displays an image according to the motion of a user. First, the user instructs the input information acquirer 42 to start the processing. Along with this, the imaging device 12 starts shooting of subjects in response to a shooting start request sent via the information processor 44 and the image acquirer 46. As pre-processing of the shooting, the imaging device 12 obtains standard shooting conditions suitable for displaying and shooting conditions suitable for marker detection according to the environments of the actual shooting space (S18). For example, a test image is actually shot with adjustment of the exposure time, the F-number, and so forth and the optimum conditions of these parameters are obtained.

Thereafter, moving image shooting of the user is started. An image frame number N at this shooting start timing is set to N=0 (S20) and the imaging device 12 first shoots stereo images under the standard shooting conditions (Y of S22, S24). The data of the stereo images is transmitted from the imaging device 12 to the image acquirer 46 to be stored in the image storage 48. The depth image acquirer 52 of the position information acquirer 50 reads out the data of the stereo images from the image storage 48 and generates a depth image by a stereo image method or the like (S26).

The depth image may be generated by using a combination of images obtained by reducing the stereo images by a predetermined scaling factor. This allows the processing to be executed with granularity matching the calculation accuracy of the distance in the depth direction and thus offers high efficiency. Furthermore, generation of noise due to execution of processing with an unnecessarily high level of detail can be suppressed. If the imaging device 12 includes the function to generate the depth image, the data of this depth image is stored in the image storage 48. Therefore, the depth image acquirer 52 reads out this data in S26 instead of generating the depth image. In any case, the depth image is generated with respect to the field of view of the image shot by the first camera 13a.

Next, the first object detector 55a of the target region detector 54 detects the region of the image of the head (S28). Specifically, an image shot by the first camera 13a among the stereo images is read out from the image storage 48 and face detection is carried out. Alternatively, template matching of the head is carried out with the depth image generated in S26. Next, by applying the region of the image of the head detected in S28 to the depth image, the second object detector 55b of the target region detector 54 detects, as the region of the image of the body, a region that is continuous with the head and has pixel values falling within a predetermined range from the pixel values of the region of the head (S30).

The image frame number is incremented (S32). Then, in the time step to shoot the next image frame (N=1), the first camera 13a of the imaging device 12 switches the shooting conditions and shoots an image for marker detection (N of S22, S34). The data of this image is transmitted from the imaging device 12 to the image acquirer 46 to be stored in the image storage 48. The marker detector 56 of the position information acquirer 50 reads out the data of the marker detection image from the image storage 48 and detects the region of the image of a marker by a search in the image (S36).

Next, the clipping region decider 60 of the image processor 58 decides a clipping region based on the region of the image of the head, the region of the image of the body, and the region of the image of the marker, detected by S28, S30, and S36, respectively (S38). Then, the display image generator 62 cuts out this clipping region, and combines it with an image separately drawn or prepared or draws an image in the region other than the clipping region for example to generate a display image and output it to the display device 16 (S40).

During the period when the processing does not need to be ended due to an order of the processing end by the user or the end of a game (N of S42), with increment of the image frame number N (S32), the processing of S24 to S30 is executed if N is an even number (Y of S22) and the processing of S34 to S40 is executed if N is an odd number (N of S22). The marker may be tracked temporally progressively by a tracking technique regarding odd-number frames other than the frame of N=1. By the above processing, a moving image in which the user in the virtual space operates a virtual object and interacts with it while moving can be displayed in real time. At the timing of the emergence of the need to end the processing, the processing relating to shooting and displaying is ended (Y of S42).

When there is no need to utilize a marker in the mode of the chat application of FIG. 12 or the like, the branch determination of S22 and the processing relating to marker detection in S34 and S36 are not executed. In this case, the processing for detection of the image of the head and detection of the image of the body in S24 to S30 is executed for all image frames or image frames selected at predetermined intervals, and an image generated by the clipping and combining processing in S38 and S40 is displayed. Furthermore, the branching of S22 does not need to be alternately carried out for image frames as described above. In the case of the mode of the chat application of FIG. 12, S40 includes processing of transmitting/receiving data of a clipping region to/from the information processing device of the other side and transmitting/receiving data of a generated display image.

According to the present embodiment described above, in the system that shoots the motion of a user and generates a display image in real time by using it, stereo images obtained under standard shooting conditions and marker detection images obtained under shooting conditions suitable for marker detection are shot in turn at predetermined frequencies. Then, the region of the image of the head is detected by using a face detection technique or the like and the region of the image of the body of the user is extracted from a depth image generated from the stereo images. Moreover, the region of the image of a marker is also detected by searching the marker detection image or performing tracking with use of this image. Then, a region in a predetermined range including the regions of these images is decided as the image of the user.

By employing this, compared with the case of carrying out marker detection by using an image shot for displaying, the influence given to the detection accuracy is reduced even when the shooting environment, the color of the clothing of the user, and so forth change. Such a status change possibly affects also the accuracy of the depth image. However, the change in the accuracy of the depth image can be absorbed by individually identifying the head region, the body region, and the marker region and combining them to decide one region in a complementary manner. As a result, display image generation with robustness against the change in the shooting status is enabled.

Furthermore, the image of the user decided in this manner is clipped and combined with a virtual world or another image. Depending on the case, by utilizing position information of the detected head, body, and marker again, such rendering that a virtual object reacts with the motion of a user or moves to the back side of the user to be hidden can be realized. The accuracy of the position information utilized can be kept irrespective of change in the shooting status as described above and thus objects in the virtual world can be drawn at accurate positions. Moreover, because images for displaying and images for marker detection are shot by one camera in a time-division manner, the position of the marker in a display image is also obtained without a deviation and an object that reacts with the motion of the marker can be accurately drawn.

The present disclosure is explained above based on the embodiment. It will be understood by those skilled in the art that the above-described embodiment is exemplification and various modification examples are possible in the combinations of the respective constituent elements and the respective processing processes thereof and such modification examples also fall within the scope of the present disclosure.

The present disclosure contains subject matter related to that disclosed in Japanese Priority Patent Application JP 2013-121242 filed in the Japan Patent Office on Jun. 7, 2013, the entire content of which is hereby incorporated by reference.

What is claimed is:

1. An information processing device comprising:
   an image acquirer configured to acquire stereo images shot by an imaging device comprising a plurality of cameras;
   a position information acquirer configured to acquire positions of objects in a field of view of the imaging device based on shot images of the objects stored in an image storage, wherein said position information acquirer comprises:
   a depth image acquirer configured to use the stereo images to generate a depth image representing a distribution of the depth position of the objects, wherein the position of objects in the depth direction is calculated from the parallax between them, and distances of the respective objects from the cameras in the depth direction are mapped on a two-dimensional coordinate of the image plane and represented as pixel values; and
   a marker detector that detects a marker held by a user in a marker detection image;
   a target region detector comprising:
   a first object detector configured to detect a region of an image of a first predetermined object from the shot image or the depth image; and
   a second object detector configured to detect a region of an image of a second object based on the positional relationship of the second object to the first predetermined object detected by the first object detector and the pixel value of the second object in the depth image;
   a clipping region decider configured to decide a clipping region comprising the first object, the second object, and the marker, wherein said first object and second object comprise the head and body of the user, respectively; and
   a display image generator configured to generate a display image by fusing the clipped region with another image,
   wherein a plurality of time delayed images of the user, defined by the first and second objects, and the marker are shot by the imaging device, and the clipping region of each of the time delayed images are successively inserted in a virtual world to create a moving image therein, said virtual world comprising other images and objects that appear to react to the user in the virtual world, thereby allowing interaction between the user and objects in the virtual world,
   wherein the marker is shot by the imaging device n times every time a user image is shot m times, where m and n are natural numbers that indicate a degree of importance of information obtained from the respective images, and
   wherein the plurality of cameras include a first camera and a second camera, wherein the second camera skips shooting an image at a time when the first camera shoots a marker detection image.

2. The image processing device according to claim 1, further comprising
   a marker detector configured to detect, from the shot image, a region of an image of a marker with which a subject is equipped,
   wherein the clipping region decider decides the clipping region in such a manner that the clipping region includes the region of the image of the marker in addition to the region of the image of the first object and the region of the image of the second object.

3. The image processing device according to claim 2, wherein
   the image acquirer acquires, as the shot image, data of a moving image shot by the camera on each image frame basis,
   the image frames cyclically include an image frame for marker detection shot under a shooting condition for detection of the region of the image of the marker by the marker detector, and
   the marker detector detects the region of the image of the marker by using the image frame for marker detection.

4. The image processing device according to claim 3, further comprising
   an information processor configured to decide whether or not to shoot the image frame for marker detection and a cycle of shooting of the image frame for marker detection and control a shooting condition in the camera.

5. The image processing device according to claim 2, wherein
   the display image generator generates the display image by combining the clipping region with another image and drawing a predetermined object at a position corresponding to at least any of the first object, the second object, and the marker.

6. The image processing device according to claim 1, wherein
   the first object detector detects a region of an image of a head of a person by face detection processing for the shot image, and
   the second object detector detects a region that is continuous from the region of the image of the head and has pixel values falling within a predetermined range in the depth image as a region of a body of the person.

7. The image processing device according to claim 1, wherein the display image generator combines the clipping region with an image in which an object in a virtual space is drawn by giving the clipping region a depth value in the virtual space relative to the camera, and executes hidden surface removal processing by comparison of the depth value between the clipping region and the object.

8. The image processing device according to claim 1, wherein
the display image generator combines the clipping region with another image and generates, as the display image, a moving image in which a predetermined object appears when a user carries out predetermined operation to the image processing device and the object moves with motion decided based on the region of the image of the second object corresponding to the user who has carried out the operation in the clipping region.

9. The image processing device according to claim 1, wherein the first object detector detects objects based on at least one of its shape, size, position, and features.

10. The image processing device according to claim 1, wherein said marker is a light emitting diode having known color and shape.

11. The image processing device according to claim 1, wherein the time delay between image shots of said user is different than the time delay between image shots of said marker.

12. The image processing device according to claim 1, wherein users at different locations are captured by imaging devices at their respective locations and the images of said users are combined to generate an image as if the users were present at one place.

13. The image processing device according to claim 1, wherein the first camera is configured to operate under different shooting conditions than the second camera.

14. The image processing device according to claim 1, wherein each of the first and second cameras is configured to operate under different shooting conditions and switch between said shooting conditions at a predetermined specified rate.

15. The image processing device according to claim 1, wherein regions of three kinds of images acquired by the position information acquirer are each acquired based on a different criterion.

16. The image processing device according to claim 15, wherein the clipping region decider decides, as the clipping region, a region that includes the regions of the three kinds of images and further includes a predetermined margin region.

17. An image processing system comprising:
an imaging device configured to shoot a moving image of a subject equipped with a marker; and
an image processing device configured to generate a display image that changes according to motion of the subject based on a position of the marker in an image frame of the shot moving image, the image processing device includes:
an image acquirer configured to acquire stereo images from an imaging device comprising a plurality of cameras;
a position information acquirer configured to acquire positions of objects in a field of view of the imaging device based on shot images of the objects stored in an image storage, wherein said position information acquirer comprises:
a depth image acquirer configured to acquire a depth image, wherein the position of objects in the depth direction is calculated from the parallax between them, and distances of the respective objects from the cameras in the depth direction are mapped on a two-dimensional coordinate of the image plane and represented as pixel values; and
a marker detector that detects a marker held by a user in a marker detection image;
a target region detector comprising:
a first object detector configured to detect a region of an image of a first predetermined object from the shot image or the depth image based on a shape or a feature; and
a second object detector configured to detect a region of an image of a second object based on the detected region of the image of the first predetermined object detected by the first object detector and the pixel value in the depth image;
a clipping region decider configured to decide a clipping region comprising the first object, the second object, and the marker, wherein said first object and second object comprise the head and body of the user, respectively; and
a display image generator configured to generate a display image by fusing the clipped region with another image,
wherein a plurality of time delayed images of the user, defined by the first and second objects, and the marker are shot by the imaging device, and the clipping region of each of the time delayed images are successively inserted in a virtual world to create a moving image therein, said virtual world comprising other images and objects that appear to react to the user in the virtual world, thereby allowing interaction between the user and objects in the virtual world,
wherein the marker is shot by the imaging device n times every time a user image is shot m times, where m and n are natural numbers that indicate a degree of importance of information obtained from the respective images, and
wherein the plurality of cameras include a first camera and a second camera, wherein the second camera skips shooting an image at a time when the first camera shoots a marker detection image.

18. An image processing method by which an image processing device generates a display image by using a shot image obtained by shooting by a camera, the image processing method comprising:
acquiring stereo image data from an imaging device comprising a plurality of cameras and storing the data of the stereo images in a storage device;
acquiring data of a depth image, wherein the position of objects in the depth direction is calculated from the parallax between them, and distances of the respective objects from the cameras in the depth direction are mapped on a two-dimensional coordinate of the image plane and represented as pixel values;
reading out the data of the stereo image or the depth image from the storage device and detecting a region of an image of a first predetermined object from the read image based on a shape or a feature;
detecting a marker held by a user in a marker detection image;
reading out the data of the depth image from the storage device and detecting a region of an image of a second object from the depth image based on the detected region of the image of the first predetermined object from the read image and the pixel value in the depth image;

deciding a clipping region including at least the region of the image of the first object, the region of the image of the second object, and the marker, wherein said first object and second object comprise the head and body of the user, respectively; and reading out the data of the stereo image from the storage device and fusing the clipped region with another image to generate the display image and output the display image to a display device, wherein a plurality of time delayed images of the user, defined by the first and second objects, and the marker are shot by the imaging device, and the clipping region of each of the time delayed images are successively inserted in a virtual world to create a moving image therein, said virtual world comprising other images and objects that appear to react to the user in the virtual world, thereby allowing interaction between the user and objects in the virtual world, wherein the marker is shot by the imaging device n times every time a user image is shot m times, where m and n are natural numbers that indicate a degree of importance of information obtained from the respective images, and wherein the plurality of cameras include a first camera and a second camera, wherein the second camera skips shooting an image at a time when the first camera shoots a marker detection image.

19. A non-transitory computer-readable recording medium in which a computer program is recorded, the computer program being for a computer, comprising:

acquiring data of a stereo image from an imaging device comprising a plurality of cameras;

acquiring a depth image, wherein the position of objects in the depth direction is calculated from the parallax between them, and distances of the respective objects from the cameras in the depth direction are mapped on a two-dimensional coordinate of the image plane and represented as pixel values;

detecting a region of an image of a first predetermined object from the stereo image or the depth image based on a shape or a feature;

detecting a region of an image of a second object based on the detected region of the image of the first object from the stereo image or the depth image and the pixel value in the depth image;

detecting a marker held by a user in a marker detection image;

deciding a clipping region including at least the region of the image of the first object, the region of the image of the second object, and the marker, wherein said first object and second object comprise the head and body of the user, respectively; and generating a display image by fusing the clipped region with another image, wherein a plurality of time delayed images of the user, defined by the first and second objects, and the marker are shot by the imaging device, and the clipping region of each of the time delayed images are successively inserted in a virtual world to create a moving image therein, said virtual world comprising other images and objects that appear to react to the user in the virtual world, thereby allowing interaction between the user and objects in the virtual world, wherein the marker is shot by the imaging device n times every time a user image is shot m times, where m and n are natural numbers that indicate a degree of importance of information obtained from the respective images, and wherein the plurality of cameras include a first camera and a second camera, wherein the second camera skips shooting an image at a time when the first camera shoots a marker detection image.

* * * * *